(12) United States Patent
Chang

(10) Patent No.: US 9,906,734 B2
(45) Date of Patent: Feb. 27, 2018

(54) METHOD AND RELATED CAMERA DEVICE FOR GENERATING PICTURES WITH ROTATION TRACE

(71) Applicant: Wistron Corporation, New Taipei (TW)

(72) Inventor: Yao-Tsung Chang, New Taipei (TW)

(73) Assignee: Wistron Corporation, New Taipei (TW)

(*) Notice: Subject to any disclaimer, the term of this patent is extended or adjusted under 35 U.S.C. 154(b) by 0 days.

(21) Appl. No.: 15/155,062

(22) Filed: May 15, 2016

(65) Prior Publication Data

US 2017/0187965 A1 Jun. 29, 2017

(30) Foreign Application Priority Data

Dec. 24, 2015 (TW) .............................. 104143483 A

(51) Int. Cl.
*H04N 5/262* (2006.01)
*H04N 5/232* (2006.01)
*H04N 5/235* (2006.01)
*H04N 5/265* (2006.01)

(52) U.S. Cl.
CPC ......... *H04N 5/2621* (2013.01); *H04N 5/2352* (2013.01); *H04N 5/23209* (2013.01); *H04N 5/265* (2013.01); *H04N 5/2628* (2013.01)

(58) Field of Classification Search
None
See application file for complete search history.

(56) References Cited

U.S. PATENT DOCUMENTS

| 9,264,630 B2* | 2/2016 | Kakkori | H04N 5/265 |
| 2006/0133786 A1* | 6/2006 | Teramoto | H04N 5/2253 396/55 |
| 2013/0208960 A1* | 8/2013 | Reisman | G06T 3/4038 382/128 |
| 2014/0218552 A1* | 8/2014 | Huang | G11B 27/034 348/218.1 |

FOREIGN PATENT DOCUMENTS

| CN | 1517273 A | 8/2004 |
| JP | 2010166461 | 7/2010 |

OTHER PUBLICATIONS

Office action dated May 11, 2017 for Taiwan application No. 104143483, filed Dec. 24, 2015, p. 2 line 5-26, p. 3 and p. 4 line 1-11.

* cited by examiner

*Primary Examiner* — James Hannett
(74) *Attorney, Agent, or Firm* — Winston Hsu

(57) ABSTRACT

A method of generating pictures with rotation trace includes controlling a camera lens to open a shutter within a first period and an image sensor to rotate an angle within the first period, so as to generate a first picture with a rotation trace.

10 Claims, 7 Drawing Sheets

METHOD AND RELATED CAMERA DEVICE FOR GENERATING PICTURES WITH ROTATION TRACE

BACKGROUND OF THE INVENTION

1. Field of the Invention

The present invention relates to a method and related camera device for generating pictures with rotation trace, and more particularly, to a method and related camera device equipped with a rotation driving unit for rotating an image sensor when a shutter is open to generate pictures with rotation trace.

2. Description of the Prior Art

In recent years, digital photography technology advances rapidly and becomes popular, various types and standards of cameras are brought to the market place. Further, handheld devices (e.g., smart phones and tablet computers) are equipped with built-in camera device to capture images and record videos, which allows users to share daily events at any times and any occasions to bring funs to the users.

Professional photographers are specialized in mastering camera devices to capture various types of pictures, such as a picture with a rotation trace. Specifically, the center of this type of picture is relatively sharper than its background, and the background presents ripples formed by multiple concentric circles. In order to capture the picture with rotation trace, a shutter speed should be long enough to capture the blurry background. Because of the long shutter speed, a small aperture is required to keep the picture in focus and avoid the center of the picture from out of focus due to hand shaking. A small ISO sensitivity is also required to avoid overexposure. Meanwhile, the photographer has to rotate the camera device to make the ripples effect in the background.

As can be seen, it is quite difficult for general users without professional skills to capture this type of picture. Therefore, how to make general users to easily capture the picture with rotation trace has become a challenge in the industry.

SUMMARY OF THE INVENTION

It is therefore an objective of the present invention to provide a method and related camera device for generating pictures with rotation trace, which allows general users to easily take pictures with rotation trace.

The present invention discloses a method of generating pictures with rotation trace. The method includes outputting a control signal to control a lens to open a shutter within a first period and control an image sensor to rotate an angle within the first period, to generate a first picture with rotation trace.

The present invention further discloses a camera device for generating pictures with rotation trace. The camera device includes an image sensor, a controller, a lens, a rotation driving unit and a memory unit. The controller is coupled to the image sensor for generating a control signal, the lens is coupled to the controller, the rotation driving unit is coupled to the controller and the image sensor for controlling the image sensor to rotate an angle, and the memory unit is coupled to the controller for storing a program code, wherein the program code instructs the controller to perform a method of generating a picture with rotation trace. The method includes outputting the control signal to control the lens to open a shutter within a first period and control the image sensor to rotate the angle within the first period, to generate a first picture with rotation trace.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
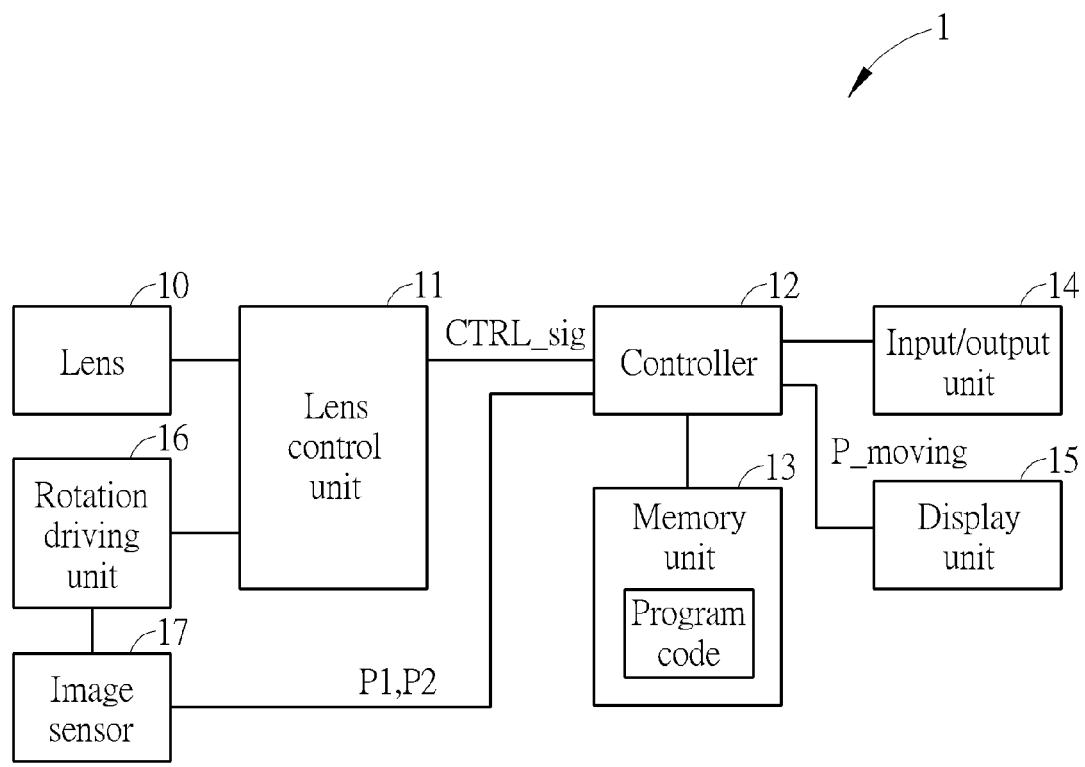
FIG. 1 is a functional block diagram of a camera device according to an embodiment of the present invention.
Figure 2:
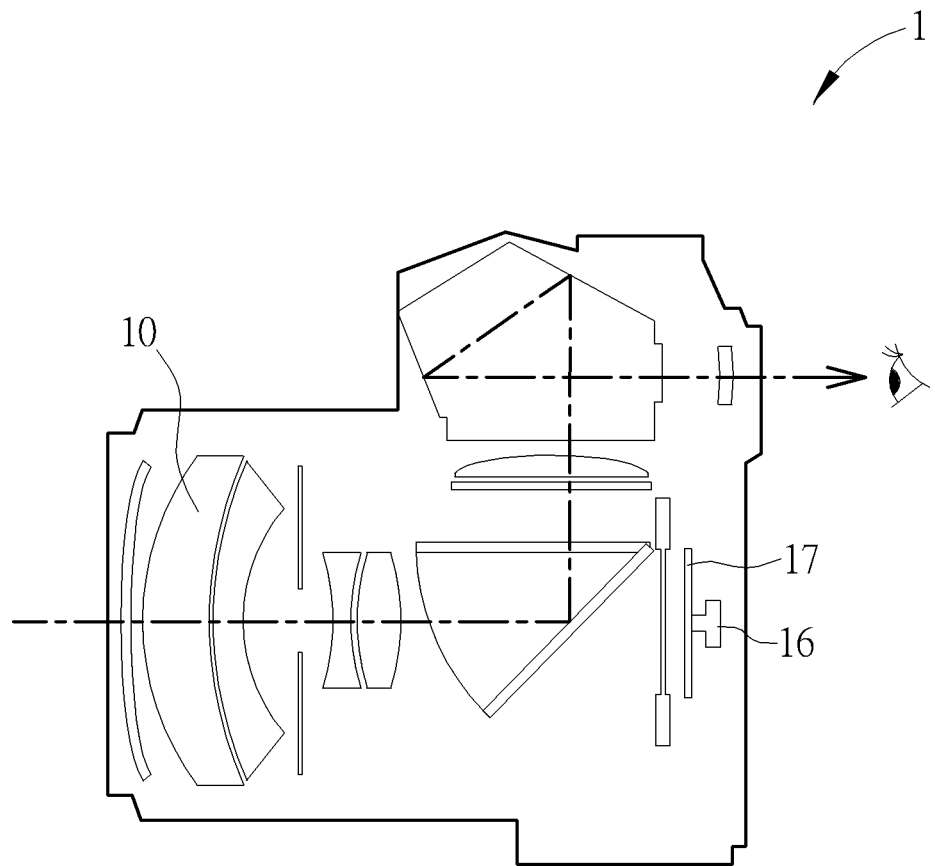
FIG. 2 illustrates a sectional view of the camera device in FIG. 1 according to an embodiment of the present invention.

FIG. 1 is a functional block diagram of a camera device 1 according to an embodiment of the present invention. FIG. 2 illustrates a sectional view of the camera device 1 according to an embodiment of the present invention. The camera device 1 is equipped with a rotation driving unit which is not equipped in traditional camera devices, and the rotation driving unit is used for rotating an image sensor when capturing pictures, so as to generate a picture with rotation traces that presents ripples formed by multiple concentric circles. As shown in FIG. 1 and FIG. 2, the camera device 1 includes a lens 10, a lens control unit 11, a controller 12, a memory unit 13, an input/output unit 14, a display unit 15, a rotation driving unit 16, and an image sensor 17.

The lens control unit 11 is coupled to the lens 10 and the controller 12, for controlling the lens 10 to capture pictures according to a control signal CTRL_sig. The control signal CTRL_sig indicates a shutter speed (including timings to open and close a shutter), an aperture, an ISO sensitivity, and a rotation angle. The memory unit 13 is coupled to the controller 12, and can be a permanent memory device for storing a program code and captured pictures and recorded videos. Moreover, the memory unit 13 can be a temporary memory device to cooperate with controller 12 when executing the program code. The input/output unit 14 is coupled to the controller 12, and functions as an input interface for receiving input commands from the user. Moreover, the input/output unit 14 also functions as an output interface for outputting the captured pictures and the recorded videos to other electronic devices. The display unit 15 is coupled to the controller 12 for displaying instant images, previewing pictures, or displaying an operating interface.

The image sensor 17 is coupled to the rotation driving unit 16, for sensing colors and lights captured by the lens 10. When capturing image, the light enters the lens 10, wherein an incident path of the light is denoted with a dashed line in FIG. 2, and the light is reflected by a reflector (e.g., pentaprism) to be guided to a view window, so the user can watch the image through the view window. At the moment that the user presses the shutter, the light captured by the lens 10 and the corresponding image can be formed on the image sensor 17. The image sensor 17 can be a photosensitive device such as a Charge Coupled Device (CCD) or a Complementary Metal-Oxide Semiconductor (CMOS) Image Sensor (abbreviated CIS).

The rotation driving unit 16 is coupled to the lens control unit 11 and the image sensor 17 for rotating the image sensor 17 by an angle, such that the image formed on the image sensor 17 is continuously superimposed during rotation, to generate the picture P_moving with rotation trace. The rotation driving unit 16 can be a servomoter driven by motive force, or a spring driven by mechanical force. The controller 12 is coupled to the lens control unit 11, the memory unit 13, the input/output unit 14 and the display unit 15, for outputting the control signal CTRL_sig to the lens control unit 11, thereby control the lens 10 to capture pictures, and control the rotation driving unit 16 to rotate the image sensor 17, so as to generate the picture P_moving with rotation trace.

Figure 3:
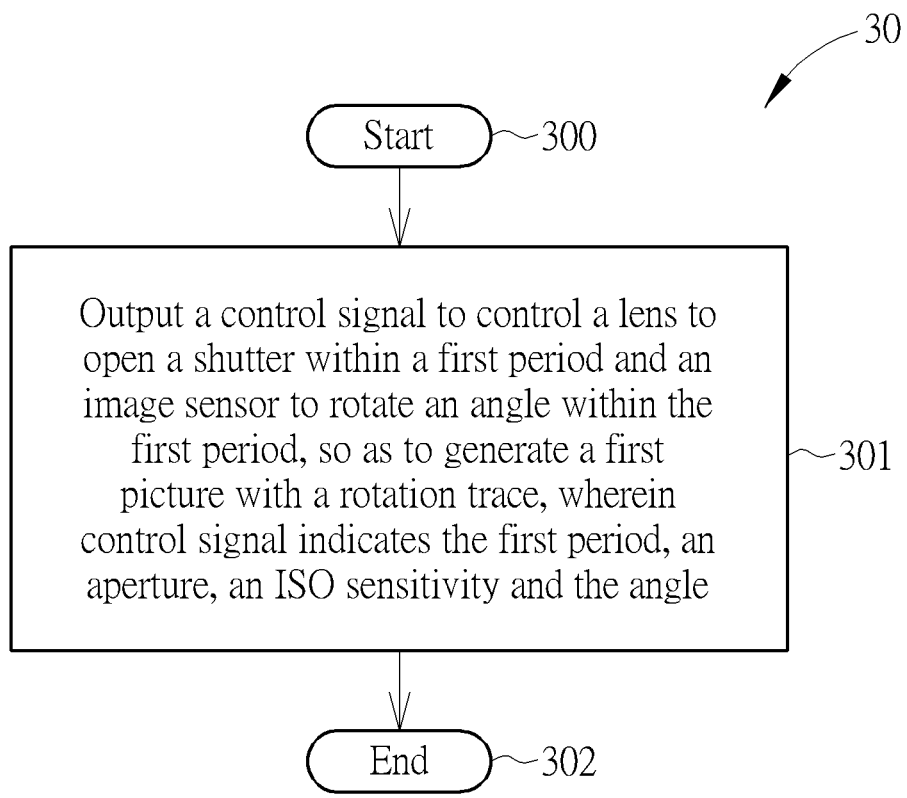
FIG. 3 is a flowchart of a process for generating a picture with a rotation trace according to an embodiment of the present invention.

FIG. 3 is a flowchart of a process 30 for generating a picture with a rotation trace according to an embodiment of the present invention. The process 30 can be compiled into a program code stored in the memory unit 13, for controlling the lens 10 to capture pictures and controlling the image sensor 17 to rotate an angle, to generate the picture P_moving with rotation trace. In FIG. 3, the process 30 includes the following steps.

Step 300: Start.
Step 301: Output a control signal to control a lens to open a shutter within a first period and an image sensor to rotate an angle within the first period, so as to generate a first picture with a rotation trace, wherein control signal indicates the first period, an aperture, an ISO sensitivity and the angle.
Step 302: End.

According to the process 30, the camera device 1 opens the shutter within the first period and simultaneously controls the image sensor to rotate an angle, so as to generate the picture with rotation trace. Given that the first period starts at a first time (i.e., shutter open timing) and ends at a second time (i.e., shutter close timing). The camera device 1 can simultaneously control the lens to open the shutter at first time and control the image sensor to rotate an angle, and then the camera device 1 simultaneously controls the lens to close the shutter at the second time and stops the image sensor from rotating, thereby generate the picture with rotation trace. Note that when the lens is capturing the picture, a long shutter speed is set, so the image is continuously superimposed together on the image sensor. As a result, by the process 30, general users can easily take the picture with rotation trace.

In another embodiment, in order to capture a sharp object in the center of the picture P_moving, the camera device 1 can respectively capture a picture with the sharp object and another picture with the blurry background via continuous shooting, and then the picture with the sharp object can be merged with the picture with the blurry background via image processing, so as to generate the picture P_moving that presents sharp object in its center and the rotation trace in its background.

In FIG. 1, the control signal CTRL_sig further indicates a shooting speed (i.e., a time interval between capturing two pictures), so the controller 12 can further control the lens 10 to perform continuous shooting through the control signal CTRL_sig. For example, the controller 12 can control the lens 10 to continuously capture two pictures, and the image sensor 17 correspondingly generates the pictures P1 and P2. Afterwards, the controller 12 executes another program code to generate the picture P_moving with rotation trace according to the pictures P1 and P2.

Figure 4:
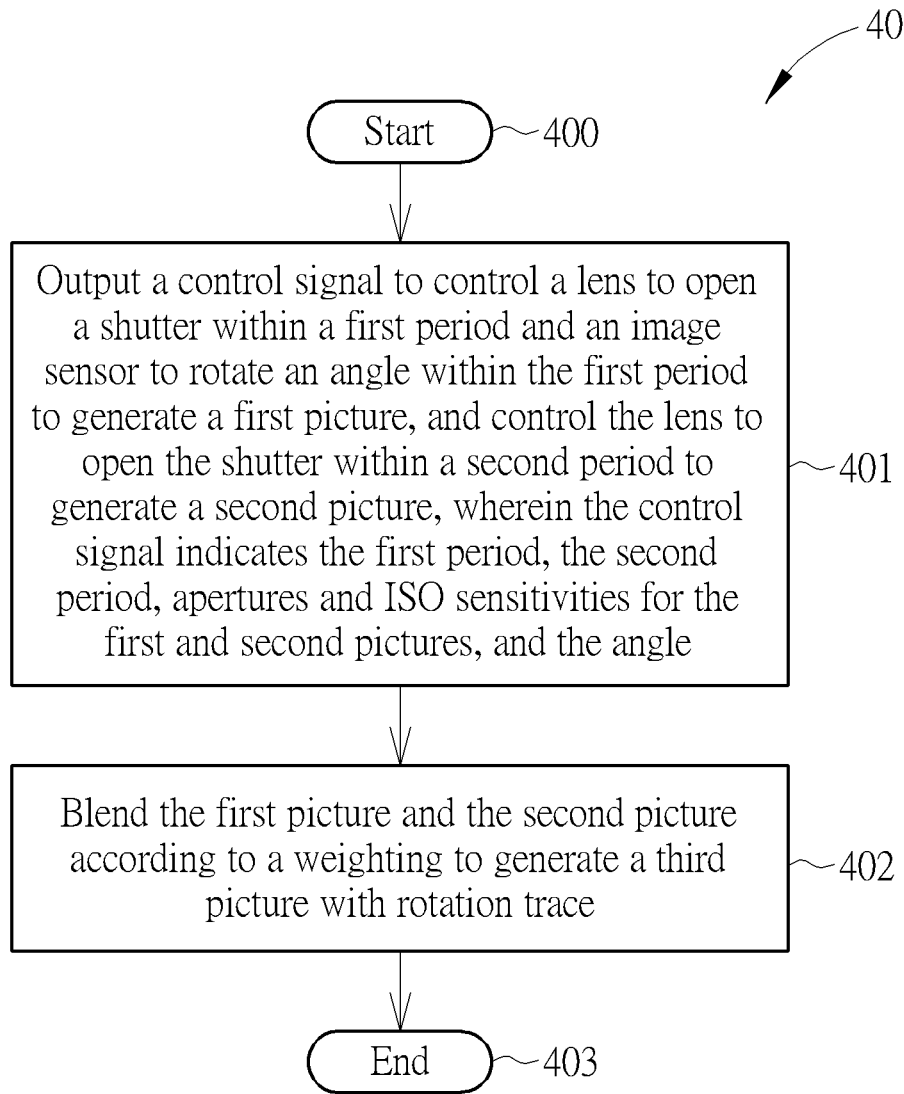
FIG. 4 is a flowchart of another process for generating a picture with a rotation trace according to an embodiment of the present invention.

FIG. 4 is a flowchart of another process 40 for generating a picture with a rotation trace according to an embodiment of the present invention. The process 40 can be compiled into a program code stored in the memory unit 13, for controlling the lens 10 to capture pictures and controlling the image sensor 17 to rotate an angle, to generate the picture P_moving with rotation trace. As shown in FIG. 4, the process 40 includes the following steps.

Step 400: Start.
Step 401: Output a control signal to control a lens to open a shutter within a first period and an image sensor to rotate an angle within the first period to generate a first picture, and control the lens to open the shutter within a second period to generate a second picture, wherein the control signal indicates the first period, the second period, apertures and ISO sensitivities for the first and second pictures, and the angle.
Step 402: Blend the first picture and the second picture according to a weighting to generate a third picture with rotation trace.
Step 403: End.

According to the process 40, in Step 401, the camera device 1 continuously captures two pictures and generates the picture with rotation trace via image processing. Note that when capturing the first picture, a long shutter speed is set, and the image sensor rotates an angle within the first period. With this manner, the image formed on the image sensor is continuously superimposed during rotation, thereby the first picture looks blurry and presents ripples formed by multiple concentric circles. When capturing the second picture, a short shutter is set (therefore, the first period is longer than the second period) to capture the sharp object and background. Finally, in Step 402, the camera device 1 blends the first picture and the second picture according to the weighting to generate the third picture with rotation trace.

The weighting can be a variable function W(R) which is positively proportional to a distance R, where the distance R is from a central coordinate to a pixel coordinate of the first picture and the second picture. To highlight the sharp main object from the blurry background, when blending the first picture and the second picture, the pixel coordinate that is closer to the central coordinate can be a composite of more the second picture and less the first picture. Therefore, a weighting of the first picture is smaller than a weighting of the second picture, such that the object or the center of the third picture is kept sharp after blending. Meanwhile, the pixel coordinate that is farther away from the central coordinate can be a composite of less the second picture and more the first picture. Therefore, the weighting of the first picture is greater than the weighting of the second picture, such that the background of the third picture looks blurry and presents ripples formed by multiple concentric circles after blending. As a result, the third picture with sharp object, blurry background and rotation trace can be generated. As a result, by the process 40, general users can easily capture the picture with rotation trace.

Note that an order to take the first and second pictures is not limited, i.e., the second period can be captured prior to the first period. Therefore, the camera device can capture the second picture prior to the first picture, in such a situation, still the picture with rotation trace can be generated, though blending the first and second pictures results in a little difference.

Figure 5:
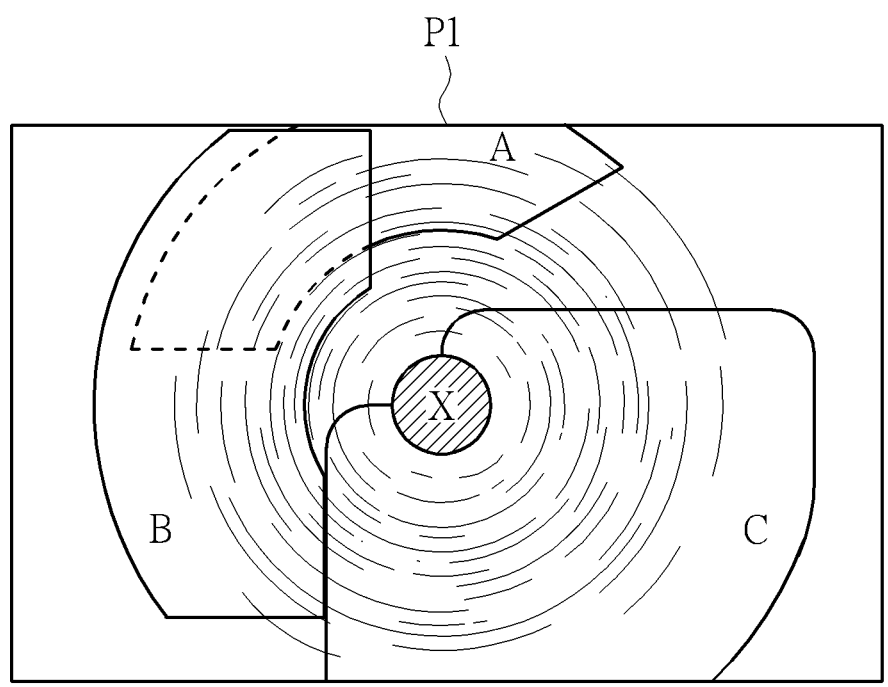
FIG. 5 illustrates a sharp picture according to an embodiment of the present invention.
Figure 6:
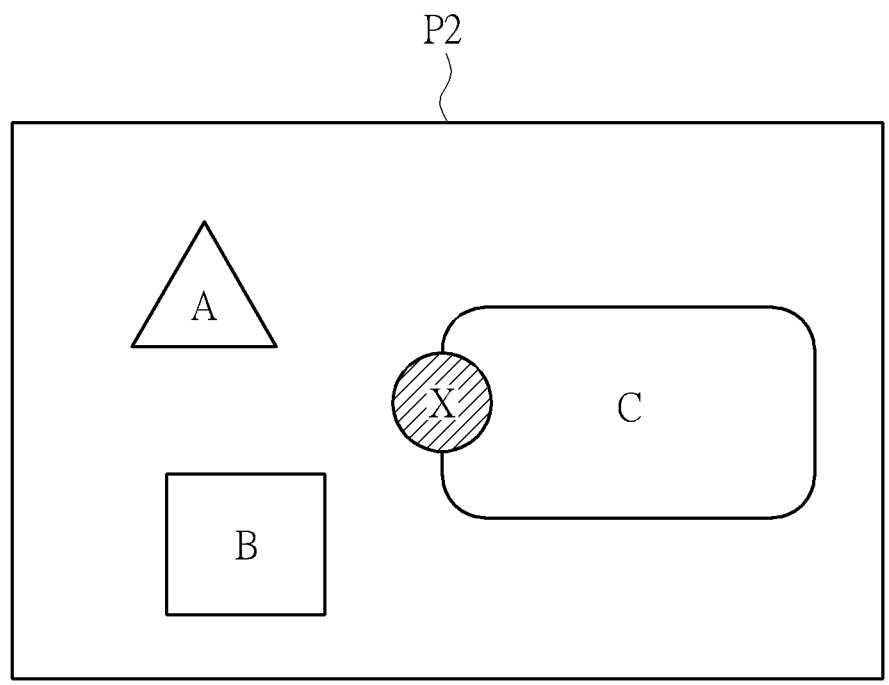
FIG. 6 illustrates a picture with rotation trace according to an embodiment of the present invention.
Figure 7:
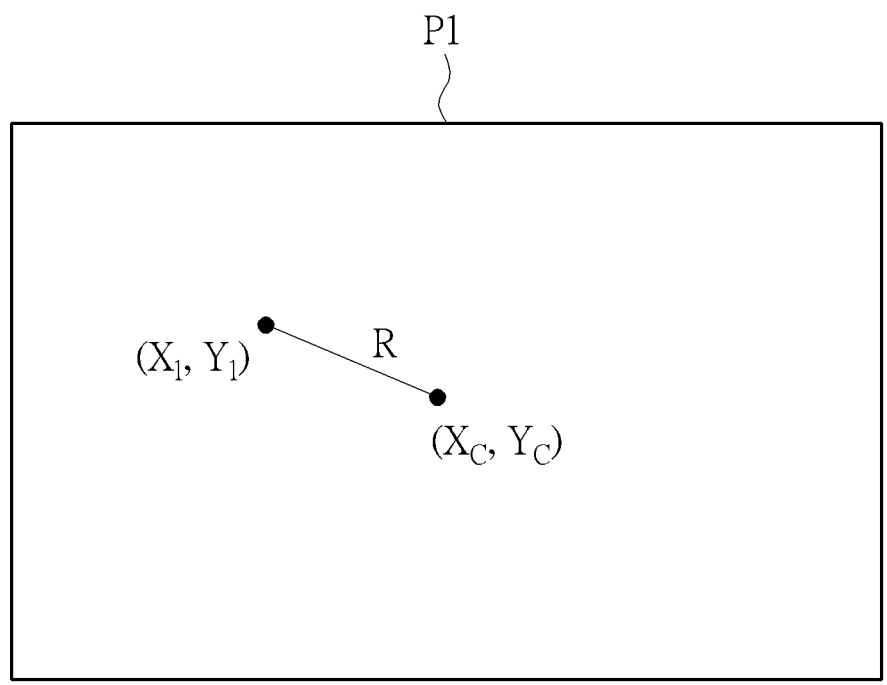
FIG. 7 illustrates an image pixel coordinate and a center coordinate of a picture according to an embodiment of the present invention.

FIG. 5 to FIG. 7 illustrate imaging processing of the camera device 1 for generating the picture P_moving with rotation trace. FIG. 5 illustrates the first picture P1 captured in the first period, FIG. 6 illustrates the second picture P2 captured in the second period, and FIG. 7 illustrates an image pixel coordinate and a center coordinate of a picture.

In FIG. 5 and FIG. 6, both the pictures P1 and P2 illustrate four objects A, B, C and X, wherein objects A, B and C belong to the background, and the object X is a main object. Given that the angle is clockwise 90 degrees, the objects A, B and C in FIG. 5 present sector-like shapes, and the object X remains a circle shape after rotation.

Therefore, when the pictures P1 and P2 are stored in a form of digital data, the pictures P1 and P2 can be described by image coordinates with certain pixel values. Take the picture P1 for example, in FIG. 7, a center coordinate is ($X_C$, $Y_C$), an image coordinate is ($X_1$, $Y_1$), and there is a distance R between the two coordinates. As mentioned above, given that the variable function W(R) is positively proportional to the distance R (i.e., the greater variable function W(R) if the greater distance R; on the contrary, the less variable function W(R) if the less distance R). When blending the pictures P1 with P2, e.g., Alpha blending, the following conversion equation can be executed to generate the picture P_moving with rotation trace.

$$\begin{bmatrix} R_3 \\ G_3 \\ B_3 \end{bmatrix} = W(R) \begin{bmatrix} R_1 \\ G_1 \\ B_1 \end{bmatrix} + [1 - W(R)] \begin{bmatrix} R_2 \\ G_2 \\ B_2 \end{bmatrix}, W(R) \in (0 \sim 1)$$

Wherein, ($R_1$, $G_1$, $B_1$), ($R_2$, $G_2$, $B_2$) and ($R_3$, $G_3$, $B_3$) are pixel values of coordinates of the pictures P1, P2 and P_moving, respectively. As can be seen from the conversion equation, the less variable function W(R) if the less distance R, which makes the weighting W(R) multiplied with the pixel values ($R_1$, $G_1$, $B_1$) being less than the weighting [1−W(R)] multiplied with the pixel values ($R_2$, $G_2$, $B_2$), so that pixel values of the picture P_moving close to the center coordinate are composites of less the pixel values of the blurry picture P1 and more the pixel values of the sharp picture P2. On the other hand, the greater variable function W(R) if the greater distance R, which makes the weighting W(R) multiplied with the pixel values ($R_1$, $G_1$, $B_1$) being greater than the weighting [1−W(R)] multiplied with the pixel values ($R_2$, $G_2$, $B_2$), so that pixel values of the picture P_moving away from the center coordinate are composites of more the pixel values of the blurry picture P1 and less the pixel values of the sharp picture P2.

In another embodiment, the pictures P1 and P2 can be divided into a first area and a second area, where the first area displays the main object, and the second area displays the background. In such a situation, the image in the first area of the picture P2 is reserved to keep the main object (i.e., the object X) being sharp, and then the images in the second area of the pictures P1 and P2 are blended according to the weighting, so as to generate the picture P_moving.

To sum up, the camera device of the present invention is equipped with a rotation driving unit for rotating an image sensor when a shutter is open to generate the picture with rotation trace that presents ripples formed by multiple concentric circles. Further, in order to keep the main object sharp, the camera device of the present invention can respectively capture a picture with the sharp object and another picture with the blurry background via continuous shooting, and then the picture with the sharp object can be merged with the picture with the blurry background via image processing, so as to generate the picture with sharp object in its center and the rotation trace in its background. As a result, general users can easily take the picture with rotation trace.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of generating pictures with rotation trace, comprises:
   outputting the control signal to control the lens to open a shutter within a first period and simultaneously control the image sensor to rotate the angle within the first period and a plurality of images formed on the image sensor is continuously superimposed, to generate a first picture with rotation trace;
   wherein the control signal indicates the first period, a first aperture, a first ISO sensitivity and the angle of the image sensor for generating the first picture;
   outputting the control signal to control the lens to open the shutter within a second period, to generate a second picture; and
   blending the first picture with the second picture according to a weighting to generate a third picture with rotation trace, which comprises:
   dividing the first picture and the second picture into a first area and a second area;
   keeping an image in the first area of the second picture; and
   blending images in the second area of the first picture and the second picture according to the weighting, to generate the second picture.

2. The method of claim 1, wherein the control signal further indicates the second period, a second aperture and a second ISO sensitivity for generating the second picture, and the first period is longer than the second period.

3. The method of claim 1, wherein the weighting is positively proportional to a variable function of a distance between a center coordinate and a pixel coordinate of the first picture or the second picture.

4. The method of claim 1, wherein the first area displays an object, and the second area displays a background.

5. The method of claim 1, used for a camera device, wherein the camera device comprises the lens, the image sensor and a rotation driving unit for controlling the image sensor to rotate the angle, and the rotation driving unit is a servomoter driven by motive force or a spring driven by mechanical force.

6. A camera device for generating pictures with rotation trace, comprises:
   an image sensor;
   a controller, coupled to the image sensor, for generating a control signal;
   a lens, coupled to the controller;
   a rotation driving unit, coupled to the controller and the image sensor, for controlling the image sensor to rotate an angle; and
   a memory unit, coupled to the controller, for storing a program code, wherein the program code instructs the controller to perform a method of generating a picture with rotation trace, wherein the method comprises:
   outputting the control signal to control the lens to open a shutter within a first period and simultaneously control the image sensor to rotate the angle within the first period and a plurality of images formed on the image sensor is continuously superimposed, to generate a first picture with rotation trace;

wherein the control signal indicates the first period, a first aperture, a first ISO sensitivity and the angle of the image sensor for generating the first picture;

outputting the control signal to control the lens to open the shutter within a second period, to generate a second picture; and blending the first picture with the second picture according to a weighting to generate a third picture with rotation trace, which comprises:

dividing the first picture and the second picture into a first area and a second area;

keeping an image in the first area of the second picture; and blending images in the second area of the first picture and the second picture according to the weighting, to generate the second picture.

7. The camera device of claim 6, wherein the control signal further indicates the second period, a second aperture and a second ISO sensitivity for generating the second picture, and the first period is longer than the second period.

8. The camera device of claim 6, wherein the weighting is positively proportional to a variable function of a distance between a center coordinate and a pixel coordinate of the first picture or the second picture.

9. The camera device of claim 6, wherein the first area displays an object, and the second area displays a background.

10. The camera device of claim 6, wherein the rotation driving unit is a servomoter driven by motive force or a spring driven by mechanical force.

* * * * *